United States Patent [19]

Suzuki et al.

[11] 4,268,579

[45] May 19, 1981

[54] PRIMER FOR POWDER COATING

[75] Inventors: Hajime Suzuki; Ikuo Masuda; Masaki Kosaka, all of Himeji, Japan

[73] Assignee: Daicel Ltd., Osaka, Japan

[21] Appl. No.: 971,242

[22] Filed: Dec. 20, 1978

Related U.S. Application Data

[63] Continuation of Ser. No. 665,374, Mar. 10, 1976, abandoned.

[30] Foreign Application Priority Data

Mar. 19, 1975 [JP] Japan .................................. 50/33229
Sep. 26, 1975 [JP] Japan ................................ 50/116099

[51] Int. Cl.³ .............................................. B05D 1/06
[52] U.S. Cl. .................................. 428/413; 427/185;
427/195; 427/202; 427/409; 427/410; 428/330;
428/458; 428/462; 428/471; 428/475.8
[58] Field of Search .................. 427/27, 29, 185, 195,
427/202; 428/330, 462, 471, 413, 458, 474

[56] References Cited

U.S. PATENT DOCUMENTS

| | | | |
|---|---|---|---|
| 2,855,376 | 10/1958 | Shotton | 428/462 |
| 2,933,466 | 4/1960 | Morgan | 260/42.32 X |
| 2,978,377 | 4/1961 | Hall et al. | 428/462 |
| 3,136,651 | 6/1964 | Spessard | 427/195 X |
| 3,264,131 | 8/1966 | Nagel | 427/195 X |
| 3,400,086 | 9/1968 | Orr | 260/42.32 X |
| 3,514,370 | 5/1970 | Canevari | 428/462 |
| 3,792,005 | 2/1974 | Harlan | 260/42.47 X |
| 3,855,194 | 12/1974 | Conard | 260/42.47 X |
| 3,897,583 | 7/1975 | Bellamy | 428/462 X |
| 3,903,026 | 9/1975 | Fujimura et al. | 260/42.47 X |
| 3,912,685 | 10/1975 | Gintz | 260/42.32 X |
| 3,930,070 | 12/1975 | Cronenberger et al. | 427/195 X |
| 3,933,724 | 1/1976 | Mixell | 260/42.47 |
| 3,944,535 | 3/1976 | Slocombe | 260/42.32 X |

FOREIGN PATENT DOCUMENTS 1806551 5/1970 Fed. Rep. of Germany ...... 427/409

*Primary Examiner*—Shrive P. Beck
*Attorney, Agent, or Firm*—Blanchard, Flynn, Thiel, Boutell & Tanis

[57] ABSTRACT

A primer composition for use in the fluidized-bed dip-coating of thermoplastic resin powder, comprising a polymeric compound formed by polymerization of a diene compound, admixed with either magnesium oxide alone or magnesium oxide together with cobalt ion and/or manganese ion.

14 Claims, 2 Drawing Figures

PRIMER FOR POWDER COATING

This is a continuation of application Ser. No. 665,374, filed Mar. 10, 1976, and now abandoned.

BACKGROUND OF THE INVENTION

1. Field of the Invention

This invention relates to a primer for use in the fluidized-bed dip-coating of thermoplastic resin powder.

2. Description of the Prior Art

Powder coating methods are considered excellent from the viewpoints of resource savings, prevention of environmental pollution and excellent coating properties.

These powder coating methods are divided into two types according to the application field, namely, decorative coating and functional coating for imparting to the coated object such properties as corrosion resistance, electric insulation, abrasion resistance and weatherability. For functional coating, the process of fluidized-bed dip-coating of thermoplastic resin powder is widely employed. In this process, the coating is applied in a thickness of several hundred microns and the using conditions employed are generally very severe. Accordingly, in addtion to degradation of the coating, the frequent occurrence of peeling is a great problem in the art of fluidized-bed dip-coating of thermoplastic resin powder.

This invention relates to a primer for preventing peeling of a thermoplastic resin coating, formed by the fluidized-bed dip-coating of thermoplastic resin powder, from a metal substrate. More particularly, this invention relates to a primer having a good resistance to hot water which otherwise promotes extremely the peeling of such a coating from a metal substrate.

A compound formed by polymerizing a diene compound has already been used as a primer for a thermoplastic resin powder, especially nylon powder. However, as is seen from the results of Comparative Example 1 given in Table 1 hereinafter, the boiling water resistance of a polymeric primer formed by polymerizing a diene compound is about 20 to about 30 hours, and this value cannot be said to be a sufficient value.

We performed research with a view to improving the boiling water resistance of polymeric primers formed by polymerizing diene compounds, but all attempts based on conventional chemical knowledge resulted in failure. For example, substances considered to have some influence on the chemical reactions of polymeric compounds formed by polymerizing diene compounds, such as radical initiators, oxidation promotors, antioxidants and peroxide decomposing agents, were found to have no effect of improving the boiling water resistance. Further, substances having an influence on the interfacial phenomenon, such as silicone oils and silane coupling agents, were found to have no effect.

Still further, fillers generally incorporated in primers or coatings, such as aluminum powder, titanium oxide, talc, hollow glass beads, zinc powder, graphite powder, aluminum oxide powder, antimony oxide and diatomaceous earth, were found to have no effect at all.

DETAILED DESCRIPTION OF INVENTION

We discovered, contrary to what might have been expected by conventional chemical knowledge, that the addition of magnesium oxide, which is readily converted to magnesium hydroxide by contact with boiling water, is very effective for improving the boiling water resistance of polymeric primers formed by polymerizing diene compounds. As is seen from the results of Example 4 given in Table 1 hereinafter, by the addition of magnesium oxide, the boiling water resistance of the primer is improved by at least 10 times. Use of the crystalline, very bulky form of magnesium oxide commonly referred to as "light" magnesium oxide is especially preferred, and as is seen from the results of Examples 1 to 7 given in Table 1 hereinafter, it is preferred that the magnesium oxide be added in an amount of 15 to 110 parts by weight, particularly 30 to 110 parts by weight, especially particularly 60 to 90 parts by weight, per 100 parts by weight of the polymeric compound formed by polymerizing a diene compound.

In addition to magneisum oxide, carbon black, finely divided silica and flowers of zinc (ZnO powder) have a certain effect, and the boiling water resistance of the polymeric compound formed by polymerizing a diene compound can be improved by from 2 to 7 times by addition of these compounds. Carbon black has the advantage that the thermal absorption is improved, but it has the disadvantage that the boiling water resistance effect of the primer becomes widely and uncontrollably variable. For example, the boiling water resistance varies in a broad range of 50 to 300 hours in coated articles obtained by performing coating under the same conditions. Finely divided silica has the advantage that it does not precipitate in solution, but it has the disadvantage that cracks are readily formed in the primer coating under some conditions. Flowers of zinc have a high specific gravity and a high sedimenting property. Accordingly, when the primer is employed in the form of a solution, it is difficult to employ flowers of zinc.

As is seen from the foregoing description, the effect of these other compounds is much lower than that of magnesium oxide and they have some other disadvantages. Accordingly, they are much inferior to magnesium oxide.

By the term "diene compound" referred to in the instant specification, there is meant polymerizable compounds having a conjugated double bond, such as butadiene and isoprene. As the film-forming polymers formed by polymerizing such diene compounds, there can be mentioned, for example, homopolymers such as polybutadiene and natural rubber shown in Examples 8 and 10 of Table 1 given hereinafter, and copolymers such as NBR (acrylonitrile-butadiene copolymer) shown in Example 9 of Table 1 given hereinafter. Further, the polymeric compound includes a low-molecular-weight polymeric compound such as disclosed in Japanese Patent Publication No. 4951/72, namely, polybutadiene having number average molecular weight of 1000 to 5000. A copolymer of butadiene is referred to include at least 50 percent of the butadiene unit.

Other components can optionally be incorporated in the primer of this invention. For example, when the primer is used in the form of a solution, in order to prevent sedimentation of magnesium oxide, there can be added a precipitation-preventing agent or dispersing agent such as finely divided silica, carbon black, metal salts of higher orgaic acid and organic compounds of monmorillonite. The amount of these agents is from 0.1 to 20 parts by weight, per 100 parts by weight of the diene polymer. Further, a dye or pigment can be added to the primer so as to prevent formation of an uncoated area and to color the primer, especially when spray coating method is employed.

The primer may contain additives that prevent the degradation of the primer at room temperature, such as phenolic antioxidants.

When the primer is used in the form of a solution, there can be used any solvents capable of dissolving the polydiene component. In order to prevent sedimentation or precipitation of magnesium oxide, it is preferred to use a solvent having a higher specific gravity.

As is seen from the results of Examples 11 to 13 given in Table 1, the primer of this invention is effective even for other thermoplastic resin powders, in addition to nylon powder. Especially, the primer of this invention has a good adhesiveness to polyethylene which cannot be bonded to metals by any conventional bonding methods and it imparts a highly improved hot water resistance when a polyethylene powder is used. The primer of this invention has a very excellent effect to nylon copolymers.

The primer of this invention is used for fluidized-bed dip-coating. The fluidized-bed dip-coating referred to in the instant specification includes all coating techniques according to which a primer is coated on a metal to be coated, the primer-coated metal is subjected to a pre-heating treatment and then a powder coating is applied. Accordingly, any known techniques such as electrostatic coating, electrostatic dip coating and flame spray coating methods can be employed for applying a powder paint to a prime-coated metal substrate.

The primer according to this invention is preferably employed in a powder coating operation and, in addition, is employed for bonding a thermoplastic resin onto a metal substrate. The bonding is carried out by coating the metal substrate with the primer, pre-heating the prime-coated metal, then contacting it with a solid or molten thermoplastic resin in order to melt the resin so that the resin forms a coating on the prime-coated metal substrate and then cooling to solidfy the resin coating. This bonding is suited, for instance, for coating wire and joining metal pieces.

As is seen from the Examples given hereinafter, the primer of this invention can be used for other metals such as aluminum and copper, and also for chemically treated metals. As the resin powder, there can be used powders of thermoplastic resins such as nylon, polyethylene and polyvinyl chloride and thermosetting resins such as epoxy resins.

A primer as above mentioned, which comprises a diene polymer and magnesium oxide, can attain the best effect when its coating thickness is from 4 to 7 microns. It has been found that the above primer substantially exerts its properties by reaction with oxygen in air and that when the thickness of the primer coating is too large, air is not sufficiently diffused into the interior of the primer layer from the surface thereof, so that the desired properties of the prime coating are not fully attained.

More specifically, we investigated various additives to find substances capable of promoting the reaction of the primer with oxygen, and it was found that certain organic peroxides and certain metal ions are effective. Above all, cobalt ion and manganese ion are especially effective for this purpose. Organic peroxides such as cumyl peroxide are effective, but they drastically shorten the pot life. Further, other metal ions, for example, ions of zinc, lead, copper and iron, are effective, but their effect is much lower than that of cobalt and manganese ions.

Another object of this invention is to provide a primer for powder coating comprising a polymeric compound formed by polymerization of a diene compound and having incorporated therein, magnesium oxide and cobalt ion and/or manganese ion.

The employment of a primer comprising a diene polymer, magnesium oxide and cobalt ion and/or manganese ion expands the permissible range of the thickness of the primer coating to from $4\mu$ to $35\mu$, whereas when the cobalt ion and/or manganese ion is not present, the permissible range is from $4\mu$ to $7\mu$, and practical application of the primer is greatly facilitated according to the invention.

The cobalt ion and/or manganese ion referred to in the instant specification is added in the form of a compound capable of being dissolved homogeneously in the polymeric compound formed by polymerization of a diene compound or in a solvent capable of dissolving therein such polymeric compound. As is seen from the results shown in the Examples given hereinafter, it is preferred that the cobalt ion and manganese ion be added in a total amount of 0.05 to 1.00 part by weight, especially 0.2 to 0.6 part by weight, per 100 parts by weight of the polymeric compound formed by polymerization of a diene compound.

This invention will now be further described by reference to the following illustrative Examples and Comparative Examples.

EXAMPLES 1 TO 13 AND COMPARATIVE EXAMPLES 1 AND 2

Figure 1:
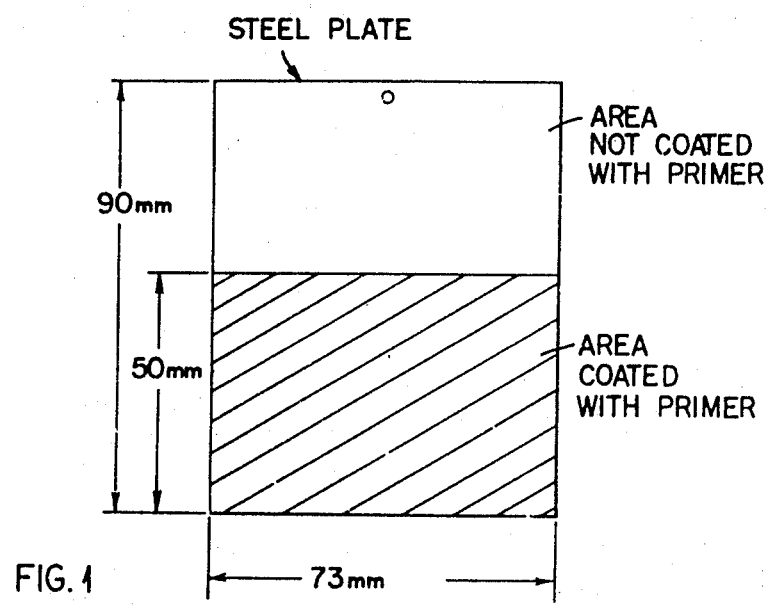
FIGS. 1 and 2 are diagrams illustrating the peeling test described in the following Examples.

The primers, having the composition set forth in Table 1, were respectively prepared by mixing a polymeric compound, an additive and a solvent by using an attrition mill (manufactured by Mitsui Miike Seisakusho K. K.). The primers were respectively dip-coated onto the primer coated area of a mild steel plate (JIS G3141 D; 90 mm×73 mm×1 mm) as shown in FIG. 1, the coated steel plate was dried and then was subjected to a pre-heating treatment for 4 minutes in a furnace maintained at 350° C. The thickness of the primer coating was about $6\mu$ Immediately after the steel plate had been withdrawn from the furnace, it was dipped in thermoplastic powder (listed in Table 1) which was in the state of being fluidized by air. The coated steel plate was then placed in a post-heat treatment furnace maintained at 240° C. for 2 minutes and then cooled with water to obtain a coated steel plate.

Figure 2:
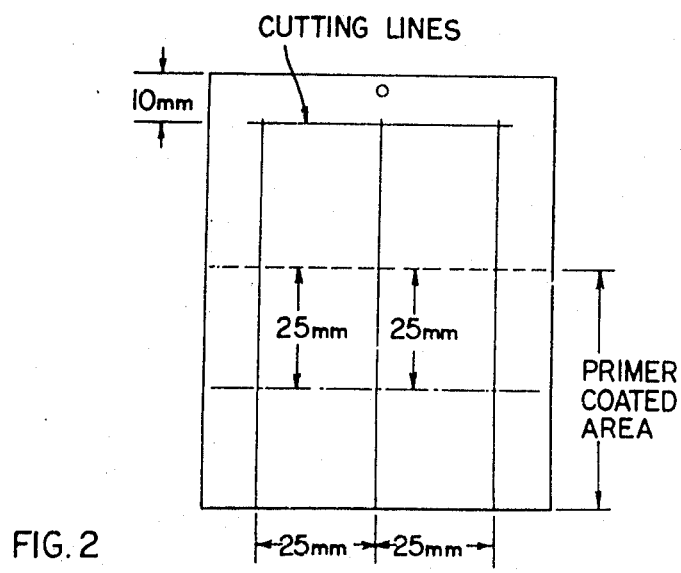

The coating of the coated plate was cut with a knife to form cut lines reaching the metal surface as shown by the solid lines in FIG. 2, and the coated plate was immersed in hot water maintained at 100° C. Peeling of the thermoplastic resin coating occurred in the area not coated with the primer, and the peeling advanced toward the primer-coated area. The time required for the peeling length to extend 25 mm into the primer coated area, that is, to reach the chain-dotted line, was measured as "peeling time". The results are shown in Table 1.

TABLE 1

| Example No. | Primer Composition Polymer Compound (parts by weight) | Additive (parts by weight) | Solvent (parts by weight) | Thermoplastic Resin Powder | Peeling Time (hours) |
|---|---|---|---|---|---|
| Comparative Example 1 | polybutadiene (molecular weight = 2000) (100) | — | carbon tetrachloride (800) | nylon 12 powder[1] | 20–30 |
| Example 1 | polybutadiene (molecular weight = 2000) (100) | light magnesium oxide (15) | carbon tetrachloride (1000) | nylon 12 powder[1] | 30–50 |
| Example 2 | polybutadiene (molecular weight = 2000) (100) | light magnesium oxide (30) | carbon tetrachloride (1200) | nylon 12 powder[1] | 60–100 |
| Example 3 | polybutadiene (molecular weight = 2000) (100) | light magnesium oxide (60) | carbon tetrachloride (1500) | nylon 12 powder[1] | 200–300 |
| Example 4 | polybutadiene (molecular weight = 2000) (100) | light magnesium oxide (70) | carbon tetrachloride (1500) | nylon 12 powder[1] | 300–500 |
| Example 5 | polybutadiene (molecular weight = 2000) (100) | light magnesium oxide (90) | carbon tetrachloride (1700) | nylon 12 powder[1] | 200–300 |
| Example 6 | polybutadiene (molecular weight = 2000) (100) | light magnesium oxide (110) | carbon tetrachloride (2000) | nylon 12 powder[1] | 60–90 |
| Example 7 | polybutadiene (molecular weight = 2000) (100) | light magnesium oxide (120) | carbon tetrachloride (2000) | nylon 12 powder[1] | 10–20 |
| Example 8 | polybutadiene rubber[2] (100) | light magnesium oxide (70) and fine silica[3] (3) | carbon tetrachloride (2500) | nylon 12 powder[1] | 300–500 |
| Example 9 | NBR[4] (100) | light magnesium oxide (70) and fine silica[3] (3) | chloroform (2500) | nylon 12 powder[1] | 300–500 |
| Example 10 | natural rubber (100) | light magnesium oxide (70) and fine silica[3] (3) | carbon tetrachloride (2500) | nylon 12 powder[1] | 300–400 |
| Comparative Example 2 | polybutadiene (molecular weight = 2000) (100) | — | carbon tetrachloride (800) | polyethylene type copolymer powder[6] | 15 days[7] |
| Example 11 | polybutadiene (molecular weight = 2000) (100) | light magnesium oxide (70) and fine silica[3] (3) | carbon tetrachloride (1500) | polyethylene type copolymer powder[6] | 35 days[7] |
| Example 12 | polybutadiene (molecular weight = 2000) (100) | light magnesium oxide (70) and fine silica[3] (3) | carbon tetrachloride (1500) | polyethylene powder[8] | 10 days[7] |
| Example 13 | polybutadiene (molecular weight = 2000) (100) | light magnesium oxide (70) and fine silica[3] (3) | carbon tetrachloride (1500) | vinyl chloride resin powder[9] | 25 days[10] |

Notes:
[1] Daiamide Z-2073 manufactured by Daicel K. K.
[2] JSR BR01 manufactured by Nippon Gosei Gomu K. K.
[3] Aerosil 380 manufactured by Nippon Aerosil K. K.
[4] JSR N-232 S manufactured by Nippon Gosei Gomu K. K.
[5] In Comparative Example 2 and Examples 11 to 13, since peeling did not advance stepwise, the time required until the coating could be readily peeled by a hand was measured as "peeling time".
[6] Admer N-100 manufactured by Mitsui Sekiyu Kagaku K. K.
[7] Tested in hot water maintained at 80° C.
[8] Prosen manufactured by Seitetsu Kagaku K. K.
[9] Evaclad No. 1210 manufactured by Kansai Paint K. K.
[10] Tested in hot water maintained at 50° C.

EXAMPLES 14-30

The components shown in Table 2 were mixed and dispersed by using a mixing and dispersing machine (Disper Mill manufactured by Hosokawa Tekko K. K.) to form a primer.

The thus-formed primer was dip-coated on a mild steel plate (JIS G3141 D; 90 mm×73 mm×1 mm) as shown in FIG. 1, and the steel plate was dried. Dipping was repeated to adjust the thickness of the primer layer. The primer thickness was measured by an electromagnetic film thickness meter. Then, the plate was subjected to the pre-heat treatment for 4 minutes in a furnace maintained at 350° C. Immediately after the steel plate had been withdrawn from the furnace, it was dipped in thermoplastic powder which was in the state of being fluidized by air, and the steel plate was then placed in a heating furnace maintained at 240° C. for 2 minutes and then was cooled with water to obtain a coated steel plate.

The coating of the coated plate was cut with a knife to form cut lines reaching the metal surface as shown in FIG. 2, and the coated plate was immersed in hot water maintained at 100° C. Peeling occurred at the area not coated with the primer, and peeling advanced toward the primer-coated area. The range of thickness of the respective primer coatings, that was effective to make longer than 15 days the time required for the peeling length to reach 25 mm in the primer coated area, is indicated by a thick solid line in Table 2.

microns on said metal substrate whereby to provide a prime-coated metal substrate, preheating said prime-coated metal substrate to a first temperature and then applying a coating of a powder of a film-forming resin on top of said prime coating film by contacting said prime-coated metal substrate with a fluidized bed of said powder of said film-forming resin, said first temperature being above the melting point of said film-forming resin, and thereby melting said film-forming resin to form a top coating film of said film-forming resin bonded to said prime coating film, and then solidfying said top coating film.

2. A process as claimed in claim 1 in which said magnesium oxide is light magnesium oxide.

3. A process as claimed in claim 1, in which said primer composition contains from 60 to 90 parts by weight of light magnesium oxide particles, per 100 parts by weight of said diene polymer.

4. A process as claimed in claim 1, in which said primer composition contains from 0.1 to 20 parts by weight, per 100 parts by weight of said diene polymer, of a substance selected from the group consisting of finely divided silica, finely divided carbon black, metal salts of higher organic acids and organic compounds of montmorillonite.

5. A process as claimed in claim 1 in which said diene polymer is polybutadiene, natural rubber or acrylonitrilebutadiene copolymer.

6. A process as claimed in claim 1 in which said film-forming resin is selected from the group consisting of

TABLE 2

| | Components of Primer | Ion (part by weight) | Thickness of Primer(μ) 0 10 20 30 40 50 | Resin powder |
|---|---|---|---|---|
| Referential Example | 100 parts by weight of polybutadiene[1], 70 parts by weight of magnesium oxide[2], 3 parts by weight of Aerosil 380 and 1400 parts by weight trichloroethane | 0 | — | nylon 12[5] |
| Example 14 | " | cobalt ion[3] | 0.05 — | " |
| Example 15 | " | " | 0.10 — | " |
| Example 16 | " | " | 0.20 ——— | " |
| Example 17 | " | " | 0.30 ——— | " |
| Example 18 | " | " | 0.40 ———— | " |
| Example 19 | " | " | 0.50 ———— | " |
| Example 20 | " | " | 0.60 ———— | " |
| Example 21 | " | " | 0.80 ———— | " |
| Example 22 | " | " | 1.00 ——— | " |
| Example 23 | " | manganese ion[4] | 0.05 — | " |
| Example 24 | " | " | (0.20) ——— | " |
| Example 25 | " | " | (0.40) ——— | " |
| Example 26 | " | " | (0.60) ———— | " |
| Example 27 | " | " | (0.80) ———— | " |
| Example 28 | " | " | (1.00) ———— | " |
| Example 29 | " | manganese ion and cobalt ion | (0.20) (0.20) ———— | " |
| Example 30[6] | " | cobalt ion | (0.35) ———————— | poly-ethylene copolymer[7] |

The embodiments of the invention in which an exclusive property or privilege is claimed are defined as follows:

1. A process comprises applying to a metal substrate a coating of a primer composition consisting essentially of a film-forming diene polymer dissolved in an inert organic solvent to form a solution, said solution having dispersed therein from 30 to 110 parts by weight of magnesium oxide particles, per 100 parts by weight of said diene polymer, and drying said coating to form a prime coating film having a thickness of from 4 to 7 nylon, polyethylene, polyvinyl chloride and epoxy resin.

7. A coated metal object prepared by the process of claim 1.

8. A process which comprises applying to a metal substrate a coating of a primer composition consisting essentially of a film-forming diene polymer dissolved in an inert organic solvent to form a solution, said solution having dispersed therein from 30 to 110 parts by weight of magnesium oxide particles, per 100 parts by weight of said diene polymer, said solution containing dissolved therein a cobalt compound, a manganese compound or a mixture of said compounds in an amount such that the solution contains from 0.05 to 1.0 prt by weight, per 100 parts of said diene polymer, of cobalt ion, manganese ion or mixture thereof, and drying said coating to form a prime coating film having a thickness of from 4 to 35 microns on said metal substrate whereby to provide a prime-coated metal substrate, preheating said prime-coated metal substrate to a first temperature and then applying a coating of a powder of a film-forming resin on top of said prime coating film by contacting said prime-coated metal substrate with a fluidized bed of said powder of said film-forming resin, said first temperature being above the melting point of said film-forming resin, and thereby melting said film-forming resin to form a top coating film of said film-forming resin bonded to said prime coating film, and then solidfying said top coating film.

9. A process as claimed in claim 8 in which said magnesium oxide is light magnesium oxide, said primer composition containing from 0.2 to 0.6 part by weight of said cobalt ion, said manganese ion or mixture thereof, per 100 parts by weight of said diene polymer.

10. A process as claimed in claim 8 in which said primer composition contains from 60 to 90 parts by weight of light magnesium oxide particles, per 100 parts by weight of said diene polymer.

11. A process as claimed in claim 8 in which said primer composition contains from 0.1 to 20 parts by weight, per 100 parts by weight of said diene polymer, of a substance selected from the group consisting of finely divided silica, finely divided carbon black, metal salts of higher organic acid and orgaic compounds of montmorillonite.

12. A process as claimed in claim 8 in which said diene polymer is polybutadiene, natural rubber, or acrylonitrilebutadiene copolymer.

13. A process as claimed in claim 8 in which said film-forming resin is selected from the group consisting of nylon, polyethylene, polyvinyl chloride and epoxy resin.

14. A coated metal object prepared by the process of claim 8.

* * * * *

UNITED STATES PATENT AND TRADEMARK OFFICE
CERTIFICATE OF CORRECTION

PATENT NO. : 4,268,579

DATED : May 19, 1981

INVENTOR(S) : Hajime Suzuki et al

It is certified that error appears in the above—identified patent and that said Letters Patent is hereby corrected as shown below:

Column 7, line 61; after "process" insert ---which---.

Column 9, line 5; change "prt" to ---part---.

Column 10, line 12; change "orgaic" to ---organic---.

Signed and Sealed this

Twenty-fifth Day of August 1981

[SEAL]

Attest:

Attesting Officer

GERALD J. MOSSINGHOFF

Commissioner of Patents and Trademarks